US011914985B2

(12) United States Patent
Liu et al.

(10) Patent No.: US 11,914,985 B2
(45) Date of Patent: Feb. 27, 2024

(54) CAMERA CAPABILITIES API FRAMEWORK AND SHARED OEM REPOSITORY SYSTEM

(71) Applicant: Snap Inc., Santa Monica, CA (US)

(72) Inventors: Weijing Liu, Foshan (CN); Xiangying Ma, Laguna Beach, CA (US); Brent Mills, Vashon, WA (US); Tuo Wang, Irvine, CA (US)

(73) Assignee: Snap Inc., Santa Monica, CA (US)

( * ) Notice: Subject to any disclaimer, the term of this patent is extended or adjusted under 35 U.S.C. 154(b) by 97 days.

(21) Appl. No.: 17/444,083

(22) Filed: Jul. 30, 2021

(65) Prior Publication Data
US 2022/0188092 A1 Jun. 16, 2022

Related U.S. Application Data

(63) Continuation of application No. PCT/CN2020/135215, filed on Dec. 10, 2020.

(51) Int. Cl.
*G06F 9/44* (2018.01)
*G06F 8/20* (2018.01)
*G06F 8/65* (2018.01)
*H04N 23/617* (2023.01)

(52) U.S. Cl.
CPC .................. *G06F 8/65* (2013.01); *G06F 8/20* (2013.01); *H04N 23/617* (2023.01)

(58) Field of Classification Search
CPC .......... G06F 8/65; G06F 8/20; H04N 5/23225
USPC .......................................................... 717/168
See application file for complete search history.

(56) References Cited

U.S. PATENT DOCUMENTS

| 6,044,408 | A | 3/2000 | Engstrom et al. |
| 2003/0184783 | A1 | 10/2003 | Shahindoust et al. |
| 2005/0209852 | A1 | 9/2005 | Beckert et al. |
| 2014/0075567 | A1* | 3/2014 | Raleigh .................. H04L 12/14 726/26 |
| 2015/0059006 | A1* | 2/2015 | White ..................... H04W 4/50 726/30 |
| 2017/0192773 | A1 | 7/2017 | Trevathan et al. |

OTHER PUBLICATIONS

"International Application Serial No. PCT/CN2020/135215, International Search Report dated Sep. 15, 21", 5 pgs.
"International Application Serial No. PCT/CN2020/135215, Written Opinion dated Sep. 15, 21", 5 pgs.

* cited by examiner

*Primary Examiner* — Chuck O Kendall
(74) *Attorney, Agent, or Firm* — Schwegman Lundberg & Woessner, P.A.

(57) ABSTRACT

A method of handling a hardware request in a computing device including one or more processors, comprises receiving a request for a hardware-related function from an application service module, determining if the hardware-related function can be provided by an OEM-specific SDK; based on a determination that the hardware-related function can be provided by an OEM-specific SDK, providing commands and parameters related to the hardware-related function to the OEM-specific SDK; based on a determination that the hardware-related function cannot be provided by an OEM-specific SDK, providing commands and parameters related to the hardware-related function to an operating system hardware abstraction layer.

14 Claims, 8 Drawing Sheets

CAMERA CAPABILITIES API FRAMEWORK AND SHARED OEM REPOSITORY SYSTEM

CLAIM OF PRIORITY

This application is a continuation of International Application Serial No. PCT/CN2020/135215, filed Dec. 10, 2020, which is incorporated herein by reference in its entirety.

BACKGROUND

With the increased use of digital images and video, affordability of portable computing devices, availability of increased capacity of digital storage media, and increased bandwidth and accessibility of network connections, digital images and video have become a part of daily life for an increasing number of people. Additionally, the expectation of device users is also that the experience of using apps on portable computing devices will continue to become more sophisticated and media-rich.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
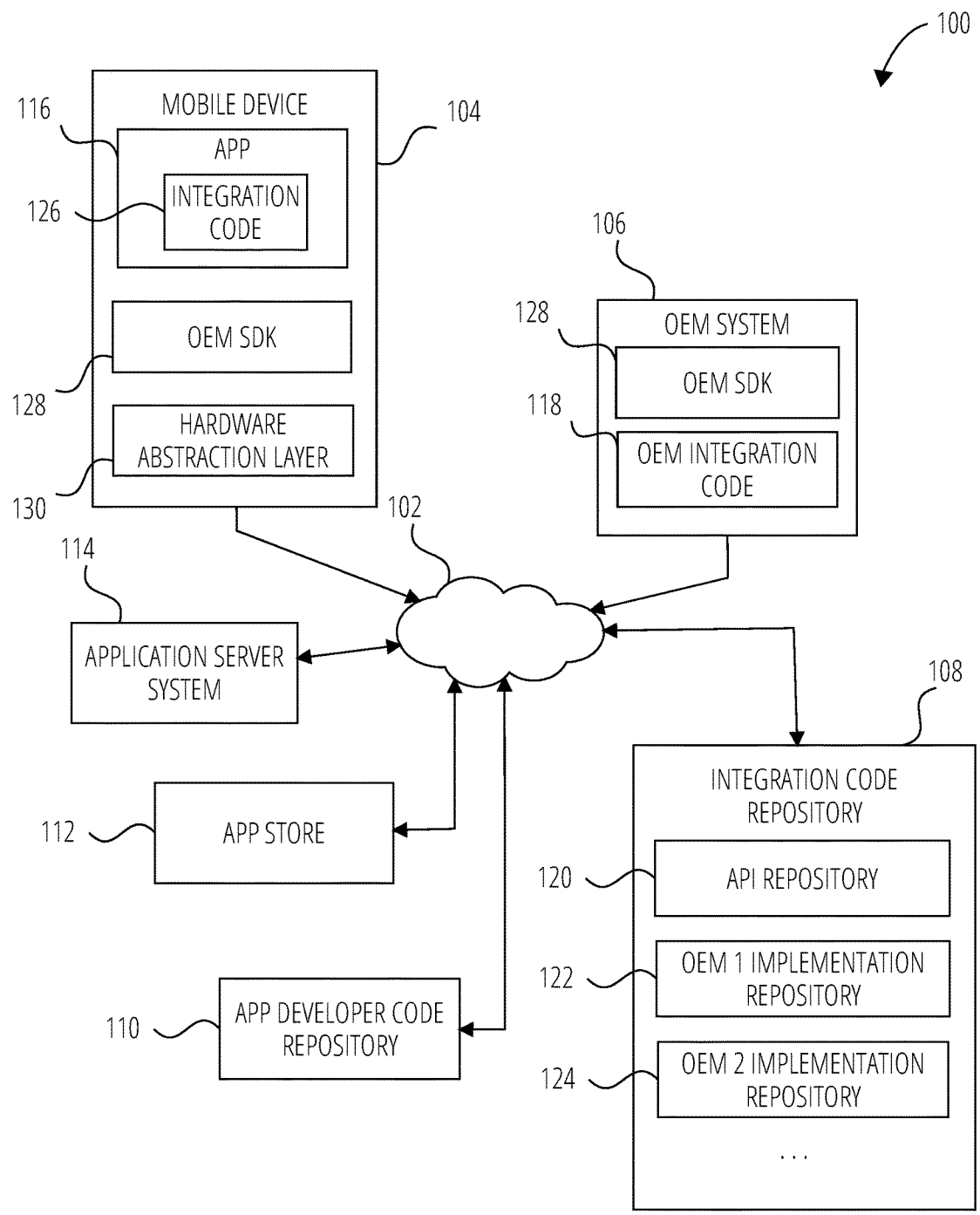
FIG. 1 is a block diagram showing an example system 100 for providing a camera capabilities API framework and shared data repository.

Users with a range of interests from various locations can capture digital images or video of various subjects and make captured images or video available to others via networks, such as the Internet. To enable computing devices to perform image/video processing or image/video enhancing operations on various objects and/or features captured in a wide range of changing conditions (e.g., changes in image scales, noises, lighting, movement, or geometric distortion) can be challenging and computationally intensive. Additionally, as cameras found in mobile devices become more sophisticated and diverse, it becomes more difficult for application developers to keep their apps up to date with the latest features and improvements offered by an OEM's latest hardware. Further, OEMs may not want to incorporate access to these features into APIs for a mobile operating system such as Android, which may permit competitors to rapidly adopt the latest features and improvements. The ability for an OEM to offer enhancements to a version of an application running on their hardware may provide a competitive advantage.

In one example, provided is a method of handling a hardware request in a computing device including one or more processors. The method comprises receiving a request for a hardware-related function from an application service module; determining if the hardware-related function can be provided by an OEM-specific SDK, based on a determination that the hardware-related function can be provided by an OEM-specific SDK, providing commands and parameters related to the hardware-related function to the OEM-specific SDK, and based on a determination that the hardware-related function cannot be provided by an OEM-specific SDK, providing commands and parameters related to the hardware-related function to an operating system hardware abstraction layer.

The determining step may be performed by a custom library downloaded to an OEM-specific hardware device. Additionally, the application service module may be contained in part of an application that is not OEM-specific.

The hardware-related function may be supported by default in an operating system of the computing device and the request for the hardware-related function may be a default request, in which case the method may further comprise providing commands and parameters related to the default request to the OEM-specific SDK.

In one example, provided is a method of providing an application that is customized for a specific computing device including one or more processors. The method comprises downloading, by the specific computing device, a first version of the application for execution on the specific computing device, querying, by the application, the specific computing device to obtain information identifying the specific computing device, and downloading, by the application executing on the specific computing device, custom hardware integration code for use with the application when executing on the specific computing device. The custom hardware integration code may be specific to a particular OEM or a particular OEM-provided device.

FIG. 1 is a block diagram showing an example system 100 for providing a camera (or other hardware) capabilities API framework and shared data repository. The system 100 includes multiple instances of a mobile device 104, each of which hosts a number of applications, including an app 116 that has been developed by an app developer. Each mobile device 104 may be communicatively coupled to other mobile devices 104 also running instances of the app 116, and an application server system 114, via a network 102 (e.g., the Internet). The mobile device 104 may also be coupled via the network to an app store 112 from which the app 116 can be downloaded and installed on the mobile device 104. The app 116 may be any kind of app that might be running on the mobile device 104 that uses the camera capabilities of the mobile device 104. In one example, the app 116 is a messaging application or a social networking application.

The mobile device 104 includes an OEM SDK 128 that is preloaded on the mobile device 104 by the OEM, and which provides an interface for the app 116 to access, for example, camera or other hardware, operating system, firmware or software capabilities that have been included by the OEM of the mobile device 104. The app 116 also includes integration code 126, which provides a bridge between the OEM SDK 128 and the app 116. The integration code 126 and OEM SDK 128 are unique to the model or family of products to which the mobile device belongs, and are unique to a particular OEM.

The mobile device also includes an OS hardware abstraction layer 130. The hardware abstraction layer 130 defines a standard interface for OEMs to implement. The hardware abstraction layer 130 allows the OS of the mobile device 104 to interact with a hardware device at a general or abstract level rather than at a detailed hardware level. The hardware abstraction layer 130 may for example comprise one or more modules corresponding to different hardware types, e.g. the camera(s), audio components, Bluetooth components, sensors, storage, peripherals etc.

In use, when the app 116 invokes a hardware-related function or feature, the app 116 will provide a call (via integration code 126) to either the hardware abstraction layer 130 or the OEM SDK 128 to accomplish the hardware-related function or invoke the hardware-related feature. The OEM SDK 128 may in turn call or coordinate with the hardware abstraction layer 130, or may interact more directly with the relevant hardware, to accomplish the hardware-related function or invoke the feature.

The application server system 114 supports various services and operations that are provided to the app 116 and that permit the app 116 to function as intended. Such operations include transmitting data to, receiving data from, and processing data generated by the app 116. This data may include message content, mobile device information, geolocation information, user-generated media, media augmentation and overlays, message content persistence conditions, social network information, live event information, login and profile information, friend groups and friend statuses as examples. Data exchanges with the application server system 114 and other mobile devices 104 are invoked and controlled through functions available via user interfaces (UIs) of the app 116.

The system 100 also may include an OEM system 106 that hosts OEM SDK 128 and OEM integration code 118. The OEM SDK 128 is developed by the OEM for use on devices provided by the OEM as is known in the art. The OEM system 106 may also include candidate OEM integration code 118 that is being developed by the OEM for submission to the app developer for inclusion in the app 116 when running on mobile devices 104 provided by the OEM.

The system 100 also includes integration code repository 108 that is managed by the app provider and may for example be hosted on a code hosting platform such as GitHub. The integration code repository 108 includes API repository 120 containing the API (provided by the app developer) from which OEMs can create their own unique versions of OEM integration code 118. The purpose of the API repository 120 is to share visibility of the API with OEM developers. The API repository 120 is maintained by the application developer and OEMs only have read but not write permissions. Any updates to the API repository 120 are provided by the app developer. Any changes to the API repository 120 made by the app developer are published to the integration code repository 108 and updated in a reference version of the API repository 120 maintained in an app developer code repository 110 owned and maintained by the app developer.

Each participating OEM will have a corresponding OEM implementation repository, for example OEM 1 implementation repository 122 for OEM 1, OEM 2 implementation repository 124 for OEM 2, etc. Each OEM implementation repository is co-maintained by the app developer and the respective OEM, and access to each OEM implementation repository is limited to the app developer and the particular OEM. Each OEM implementation repository contains an OEM integration code library, which is the OEM's implementation of the API provided by the app developer and maintained in the API repository 120. Upon review and approval of an OEM implementation of the OEM integration code 118, the app developer may transfer the approved integration code to the app developer code repository 110 where it can be incorporated into a custom version of the app 116.

Also included in the system is an app store 112 such as Google Play or Apple's App Store that hosts apps for download and use on mobile devices 104 running on Android or iOS respectively. The app developer, after integrating the approved OEM integration code 118 into a version of the app 116, which is now tailored for use with a mobile device 104 provided by the OEM, can upload that version of the app 116 to the app store 112 where it is hosted and available for download and installation by the mobile device 104. Alternatively, the approved OEM integration code 118 can be provided as a runnable library that can be downloaded onto mobile device 104 and called by a generic version of the app 116.

In use of the system 100, an OEM, after registering with the integration code repository 108 (with the approval of the app developer), downloads the API from the API repository 120 for use in developing the OEM integration code 118. The OEM then prepares a custom version, the OEM integration code 118, from the API downloaded from the API repository 120. Upon completion, the OEM integration code 118 is uploaded from the OEM system 106 to the integration code repository 108 into an OEM implementation repository, e.g. OEM 1 implementation repository 122 or OEM 2 implementation repository 124 etc., where it can be downloaded by the app developer for review. Alternatively, the OEM integration code 118 is uploaded for review into the app developer code repository 110 directly from the OEM system 106.

After approval of the OEM integration code 118 by the app developer, the approved OEM integration code 118 is incorporated by the app developer into a custom version of the app 116, or into a custom runnable library, for use on mobile devices 104 supplied by the OEM. The custom version of the app 116 or the custom runnable library will include information identifying the mobile devices 104 (e.g. OEM name, model number, family name, operating system, etc.) for which the OEM integration code 126 has been created. The custom runnable library or the custom version of the app 116 is then uploaded to the app store 112 where it is available for download by users of mobile devices 104.

When a user of a mobile device 104 requests a download of the app 116, the mobile device 104 queries the app store 112 and downloads a generic version of the app 116. When the app 116 is executed by the mobile device 104, the app 116 queries the mobile device 104 to obtain information identifying the mobile device 104 (e.g. OEM name, model number, operating system, etc.).

The app 116 then queries the app store 112 to determine if there is integration code 126 for the app 116 that has been customized for the particular mobile device 104. If so, an addition to the app 116 is provided by the app store 112 to the mobile device 104 to supplement or update the generic version of the app. In one embodiment, the addition is a custom runnable library that is dynamically delivered from the app store 112 to the mobile device 104. The custom runnable library will be invoked by the generic version of the app 116 in use, thereby to provide a customized version of the app 116.

Alternatively, the app 116 queries the app store 112 to determine if there is a version of the app 116 with integration code 126 that has been customized for the particular mobile device 104, which can then replace the generic version of app 116.

Figure 2:
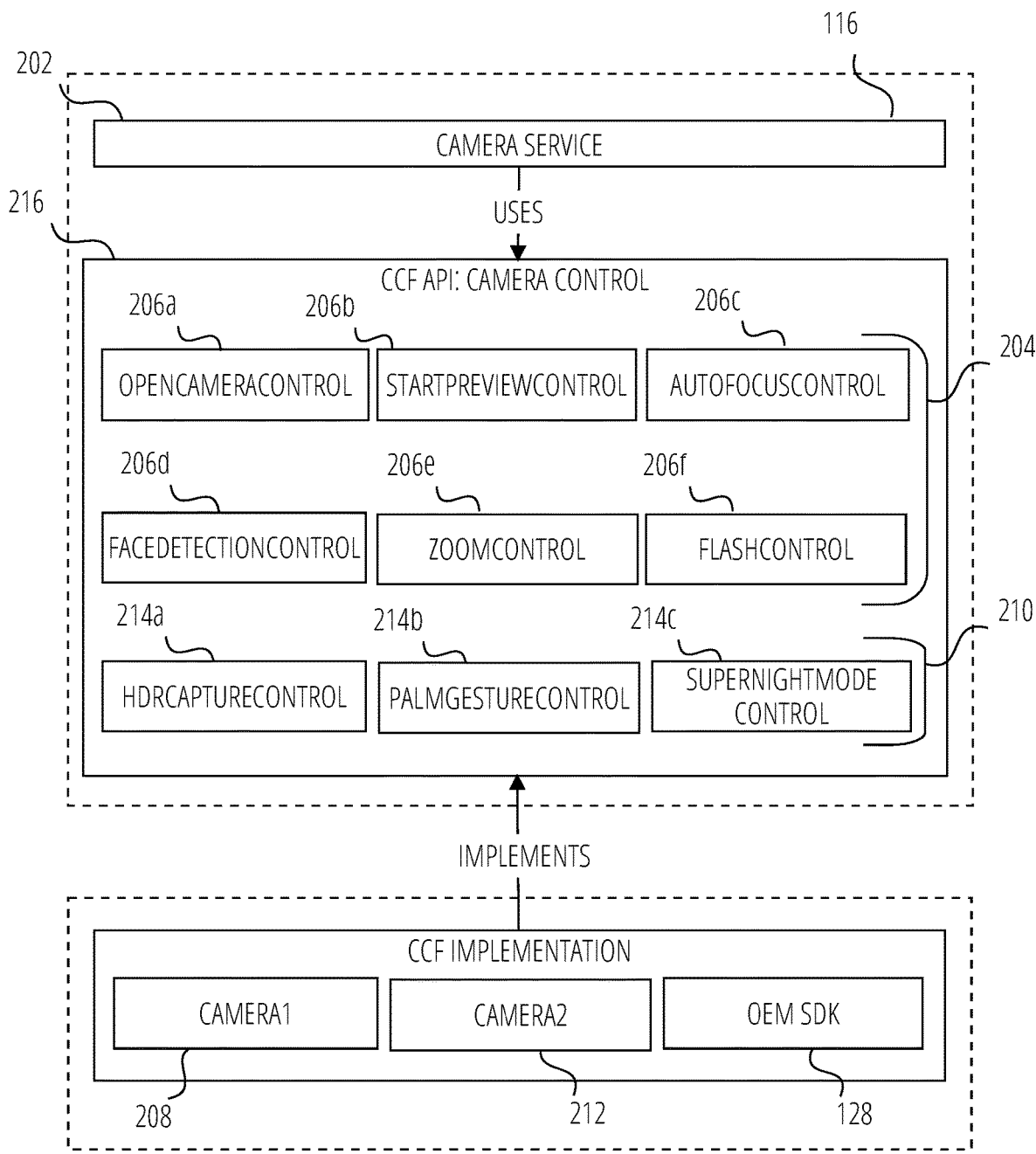
FIG. 2 shows an example of an architecture of the app of FIG. 1.

FIG. 2 shows an example of an architecture of the app 116 of FIG. 1 and its interaction with the hardware abstraction layer 130 and the OEM SDK 128. For purposes of clarity, only the camera service module 202 and the integration code 126 of the app 116 are illustrated. It will be apparent that app 116 comprises numerous functional and service modules.

The camera service module 202 receives a request (e.g. invoke SuperNightMode, FaceDetection etc.) from one of the other modules of the app 116, e.g. a user interface module (not shown), to initiate a camera function or feature. This request, with any related parameters (e.g. zoom in or out, flash on or off), is passed from the camera service module 202 to the integration code 216 for processing.

Integration code 216, which is an example of integration code 126, comprises a number of camera control interfaces. As illustrated, integration code 216 comprises a first group 204 of OS camera control interfaces 206a to 206f that are standard to the operating system. For example, group 204 might comprise camera control interfaces from Google's Android Camera1, Camera2 or CameraX libraries that provide hardware agnostic or common camera controls. For example, autofocus control, set flash, camera preview, take picture, record video, optical or electronic image stabilization, face detection, zoom control, etc.

The integration code 216 also includes a group 210 of custom OEM camera control interfaces 214a to 214c. The custom OEM control interfaces have been designed by an application developer and implemented by an OEM to enable access to camera functions or features that are specific to the OEM's implementation of features or functions or to the hardware of the mobile device 104, and comprise the unique or implementation-specific portion of the integration code 216. For example, group 210 might comprise camera control interfaces relating to High Dynamic Range capture, an enhanced night mode, a mode in which the camera is controlled by gestures, a bokeh mode, one or more post capture (or "beauty") modes, a mode in which autofocus priority is given to faces, etc.

Upon receipt of a request from the camera service module 202, the relevant one of the camera control interfaces in group 204 or group 210 passes appropriate commands and parameters either to the hardware abstraction layer 130 (e.g. OS hardware abstraction module 208 or OS hardware abstraction module 212 in FIG. 2) or the OEM SDK 128, which in turn implements the appropriate commands at the hardware level.

In the case of OS camera control interfaces 206a to 206f, the relevant commands and parameters are directed to, and are received by, OS hardware abstraction module 208 or OS hardware abstraction module 212 as appropriate. For example OS hardware abstraction module 208 may be Android Camera1 while 212 may be Android Camera2, for flexibility. In the case where a standard operating system camera control interface in group 204 has a corresponding OEM-specific implementation in the OEM SDK 128, the relevant commands and parameters are directed to, and are received by, the OEM SDK 128 instead of one of the hardware abstraction modules.

In the case of custom OEM camera control interface 214a to 214c, the relevant commands and parameters are directed by integration code 216 to, and are received by, OEM SDK 128, enabling the app 116 to have access to custom camera functionality that is unique or specific to the OEM. In this manner, the app developer can benefit from custom OEM functions or features that are specific to mobile device 104, and which may be different from or improved over OS standard or generic camera controls. Similarly, the OEM can benefit by providing users of the app 116 with custom OEM functions or features that are specific to the OEM's mobile device 104 and that are different from the offerings of competitors, enhancing the appeal of the mobile device 104.

Figure 3:
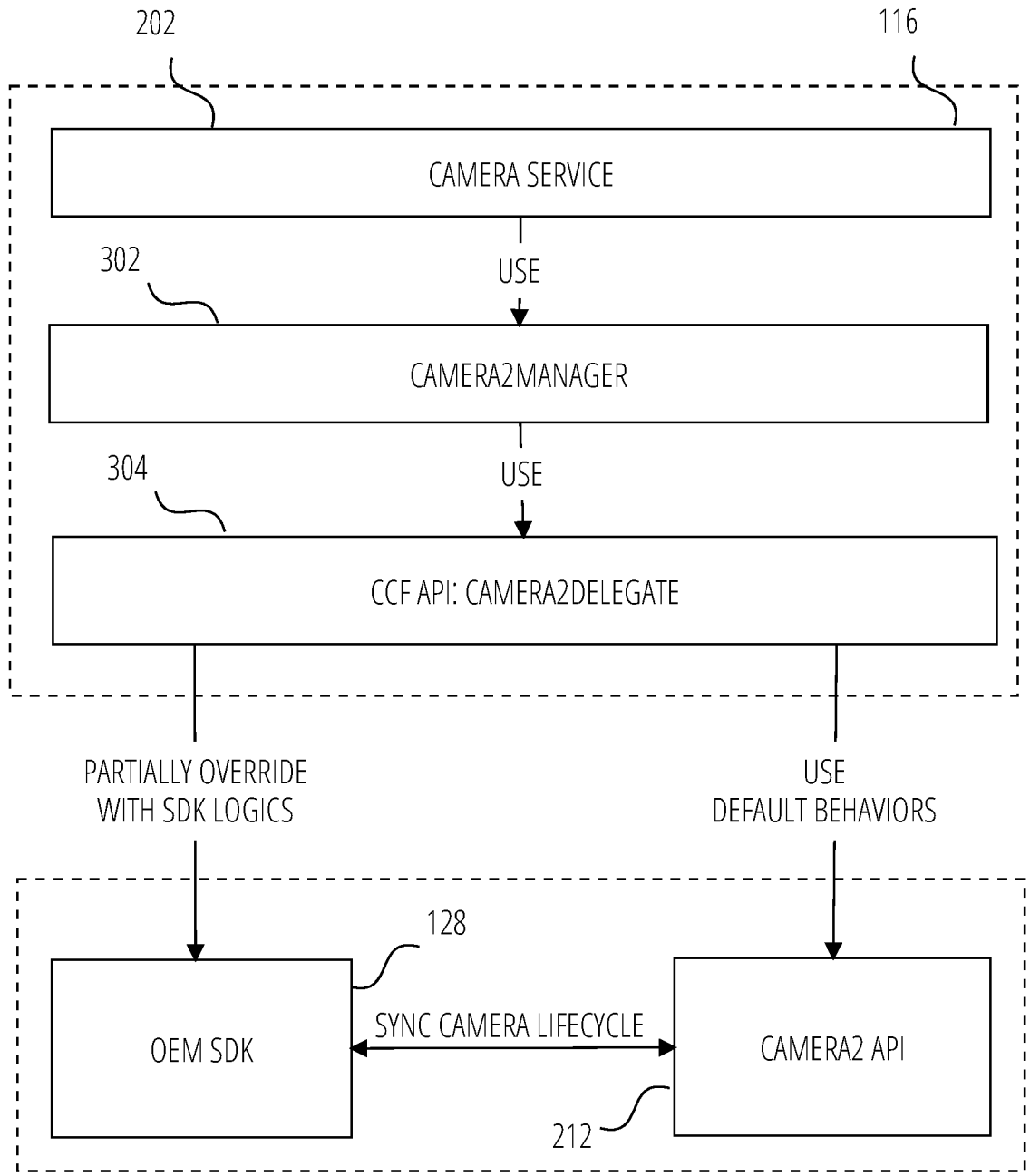
FIG. 3 shows an alternative example of an architecture of the app of FIG. 1.

FIG. 3 shows an alternative example of an architecture of the app 116 of FIG. 1 and its interaction with the OS hardware abstraction module 212 and the OEM SDK 128. In this case, the app 116 includes service manager 302 and integration code 304. When the camera service module 202 receives a request from one of the other modules of the app 116 then the request, with any related parameters (e.g. zoom in/out, flash on/off), is passed from the camera service module 202 to service manager 302. Service manager 302 is generic to the OS. For example, the service manager 302 may be the Android Camera2 Manager, which is a system service manager for detecting, characterizing, and connecting to the Android Camera2 API. The service manager 302 in turn passes requests from the camera service module 202 to integration code 304 instead of to an OS hardware abstraction layer 130 as would normally happen Integration code 304 is a simplified version of integration code 216, which can enable a partial override of any default camera behaviors for camera functions or features that are specific to the OEM's implementation or hardware of the mobile device 104.

That is, when receiving a default request from service manager 302 that does not have an OEM-specific implementation, the relevant commands and parameters are directed by the integration code 304 to, and are received by, the OS hardware abstraction module 212 for default processing by OS hardware abstraction module 212. However, when receiving a default request from service manager 302 that does have an OEM-specific implementation, the relevant commands and parameters are directed by the integration code 304 to, and are received by, OEM SDK 128, enabling the app 116 to have access to custom camera functionality that is unique or specific to the OEM instead of the default camera functionality contemplated in OS hardware abstraction module 212.

As illustrated by the arrow between OEM SDK 128 and OS hardware abstraction module 212 in FIG. 3, the OEM SDK 128 may also invoke OS hardware abstraction module 212 for camera operations, such as open camera preview, close camera, take picture, etc.

The benefit of the FIG. 3 architecture is that integration code 304 may be more concise than integration code 216. Additionally OEMs may be more familiar with service manager 302 and OS hardware abstraction module 212, potentially providing easier implementation. The disadvantage of the FIG. 3 architecture is that it is limited to existing service manager 302 commands and functions.

Figure 4:
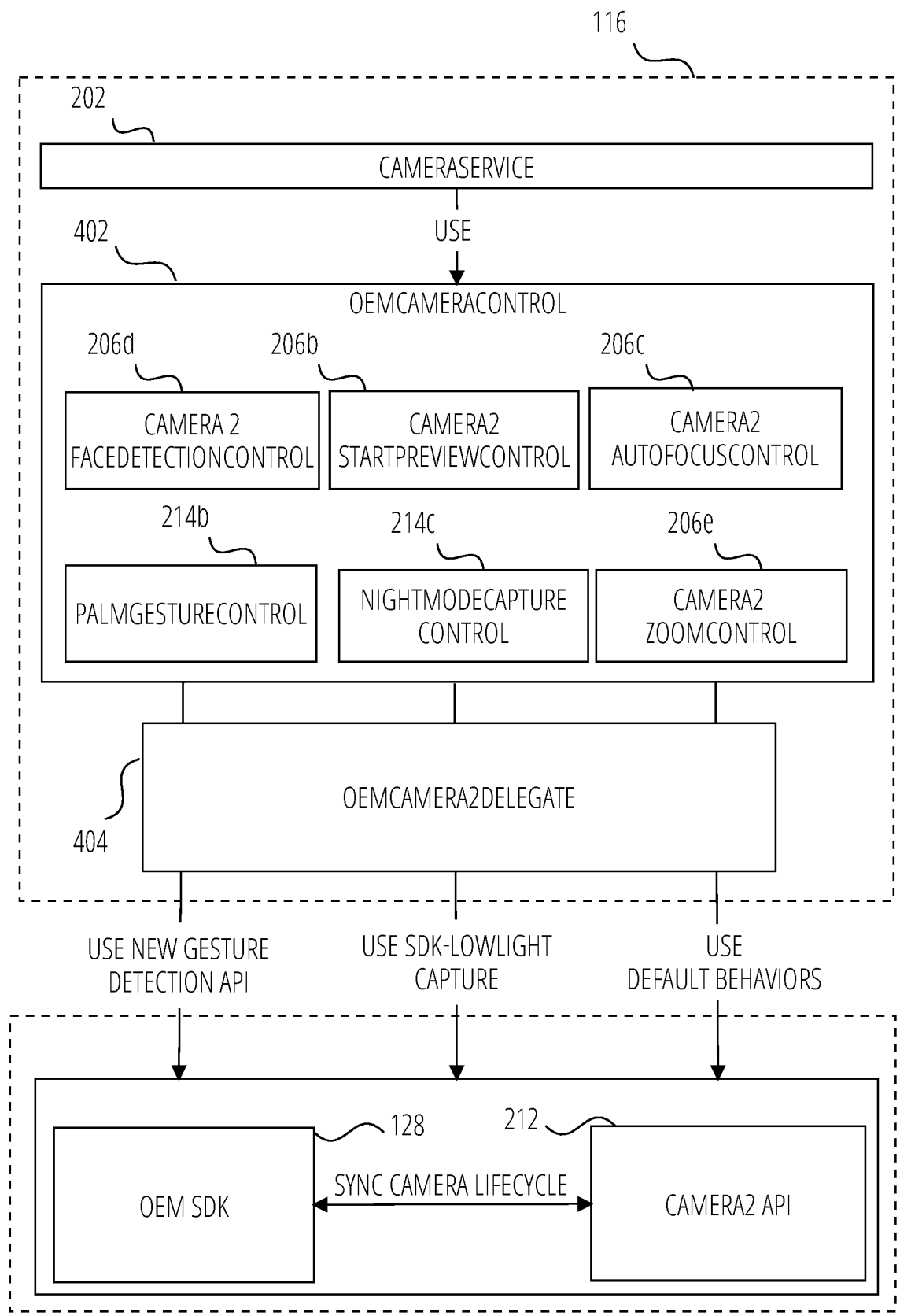
FIG. 4 shows an alternative example of an architecture of the app of FIG. 1

FIG. 4 shows a further alternative example of an architecture of the app 116 of FIG. 1 and its interaction with the OS hardware abstraction module 212 and the OEM SDK 128. This is a hybrid implementation of the architectures of FIG. 2 and FIG. 3.

As shown in FIG. 4, in this example, the app 116 includes both integration code 402, which corresponds generally to integration code 216 of FIG. 2, and integration code 404, which corresponds generally to integration code 304 of FIG. 3. In this case, integration code 404 functions as a submodule of integration code 402.

The architecture of FIG. 4 may provide benefits in terms of flexibility and scalability. For example, integration code 402, which provides a partial override of any default camera behaviors for camera functions or features that are specific to the OEM's implementation or hardware of the mobile device 104 as described above for integration code 304, may be reusable with no or little modification across different mobile devices 104, with different capabilities, provided by a particular OEM. Additionally, the ability to override existing camera control interfaces (e.g. OS camera control interface 206d from group 204) using the more concise integration code 404/integration code 304, may provide quicker initial development than the architecture of FIG. 2. In such a case, integration code 402 provided by the app developer does not need to be modified by the OEM in order to provide a degree of customization.

However, the architecture of FIG. 4 also provides scalability benefits. The OEM can develop a custom version of integration code 402 that incorporates one or more custom OEM camera control interfaces, e.g. OEM camera control interface 214b as shown in FIG. 4. As described above, such custom OEM control interfaces have been generated by an OEM to enable access to camera functions or features that are specific to the OEM's implementation or hardware of the mobile device 104, and that may not be found as default camera behaviors in service manager 302 that can be overridden by integration code 404.

For example, when receiving a default request from camera service module 202, the relevant commands and parameters are directed by the integration code 402 to, and are received by, the integration code 404. If there is not an OEM-specific implementation of the default command, the integration code 404 passes the commands and parameters to the OS hardware abstraction module 212 for handling using default functions and behaviors.

However, when receiving a default request from camera service module 202 that does have an OEM-specific implementation, the relevant commands and parameters are directed by the integration code 404 to, and are received by, OEM SDK 128, enabling the app 116 to have access to custom camera functionality that is unique or specific to the OEM instead of the default camera functionality contemplated in OS hardware abstraction module 212. For example, if OS hardware abstraction module 212 supports a Night Mode Capture function but the OEM SDK 128 has an OEM-specific implementation of Night Mode Capture, integration code 404 will direct relevant commands and parameters to OEM SDK 128 instead of OS hardware abstraction module 212.

As illustrated by the arrow between OEM SDK 128 and OS hardware abstraction module 212 in FIG. 4, the OEM SDK 128 may also invoke OS hardware abstraction module 212 for camera operations, such as open camera preview, close camera, take picture, etc.

On the other hand, if camera service module 202 provides a request to integration code 402 that is not supported by the OS hardware abstraction module 212, then integration code 402 will provide relevant commands and parameters to integration code 404 which will in turn pass relevant commands and parameter to OEM SDK 128. For example, if the OEM SDK 128 has gesture control functionality (e.g. requested via OEM camera control interface 214b) not contemplated by default command, integration code 402 will pass relevant commands and parameters to OEM SDK 128 via integration code 404 as shown in FIG. 4.

Figure 5:
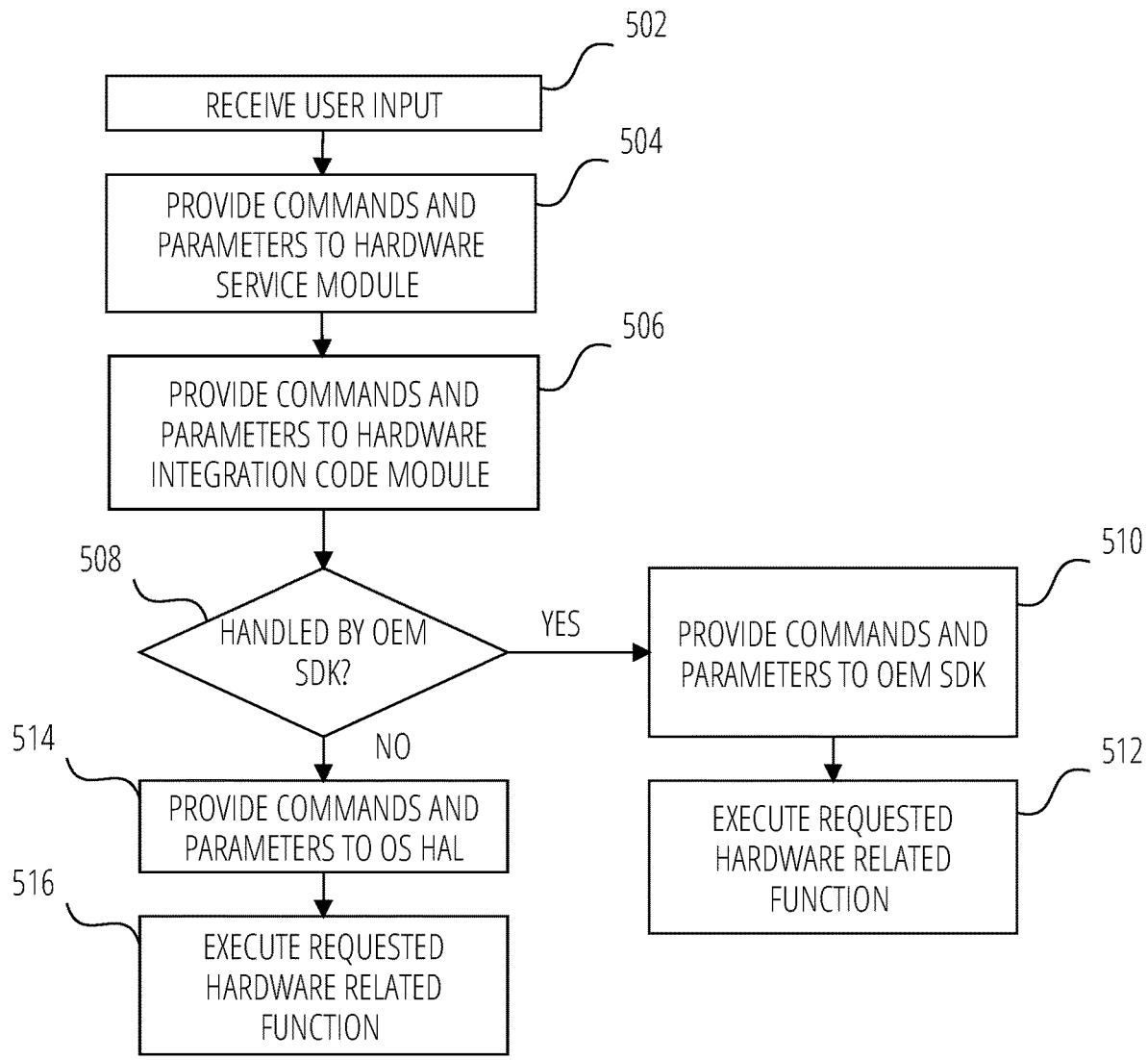
FIG. 5 is a flowchart illustrating a method of implementing a camera or other hardware API framework in an app running on a mobile device.

FIG. 5 is a flowchart illustrating a method of implementing a camera or other hardware API framework in an app 116 running on a mobile device 104. The method starts at operation 502 with the app receiving user input requesting that a hardware-related function be performed by the app 116 and mobile device 104 in operation 602. The user input may for example be the selection of a hardware-related function via a user interface of the app displayed on a display of the mobile device, or the actuation of one or more buttons of the mobile device 104, which will be received by a UI service component of the app 116. The user input may for example be the selection of a camera function as discussed above.

Commands and parameters relating to the specific user input are provided by the UI service component to the relevant hardware service module contained in the app 116. In the case of selection of a camera function, for example "enable night mode" or "record video," the appropriate commands and parameters are provided to an app hardware service module, e.g. camera service module 202, as shown in operation 504.

Upon receipt of the appropriate commands and parameters by the app hardware service module, e.g. camera service module 202, at operation 506 the app hardware service module provides relevant commands and parameters to a hardware integration code module, e.g. integration code 126, that is specific to the model or family of products to which the mobile device belongs, and that are unique to a particular OEM.

Upon receipt of the appropriate commands and parameters by the hardware integration code module, at operation 508 the hardware integration code module determines whether or not the hardware-related function can be handled by an SDK provided by the OEM that has provided the mobile device 104, in 508. In the event that the hardware-related function can be handled by the SDK provided by the OEM (e.g. OEM SDK 128), relevant commands and parameters are provided to the SDK at operation 510. In the event that the hardware-related function cannot be handled by the SDK provided by the OEM (e.g. OEM SDK 128), relevant commands and parameters are provided to an operating system hardware abstraction layer, e.g. hardware abstraction layer 130 at operation 514.

Upon the receipt of relevant commands and parameters by the OEM SDK at operation 510, the OEM SDK executes the requested hardware-related function using an OEM-specific custom implementation of the hardware-related function embodied in the OEM SDK, at operation 512.

Upon the receipt of relevant commands and parameters by the hardware abstraction layer at operation 516, the hardware abstraction layer executes the requested hardware-related function using a conventional or standard implementation of the hardware-related function embodied in the hardware abstraction layer at operation 512.

Figure 6:
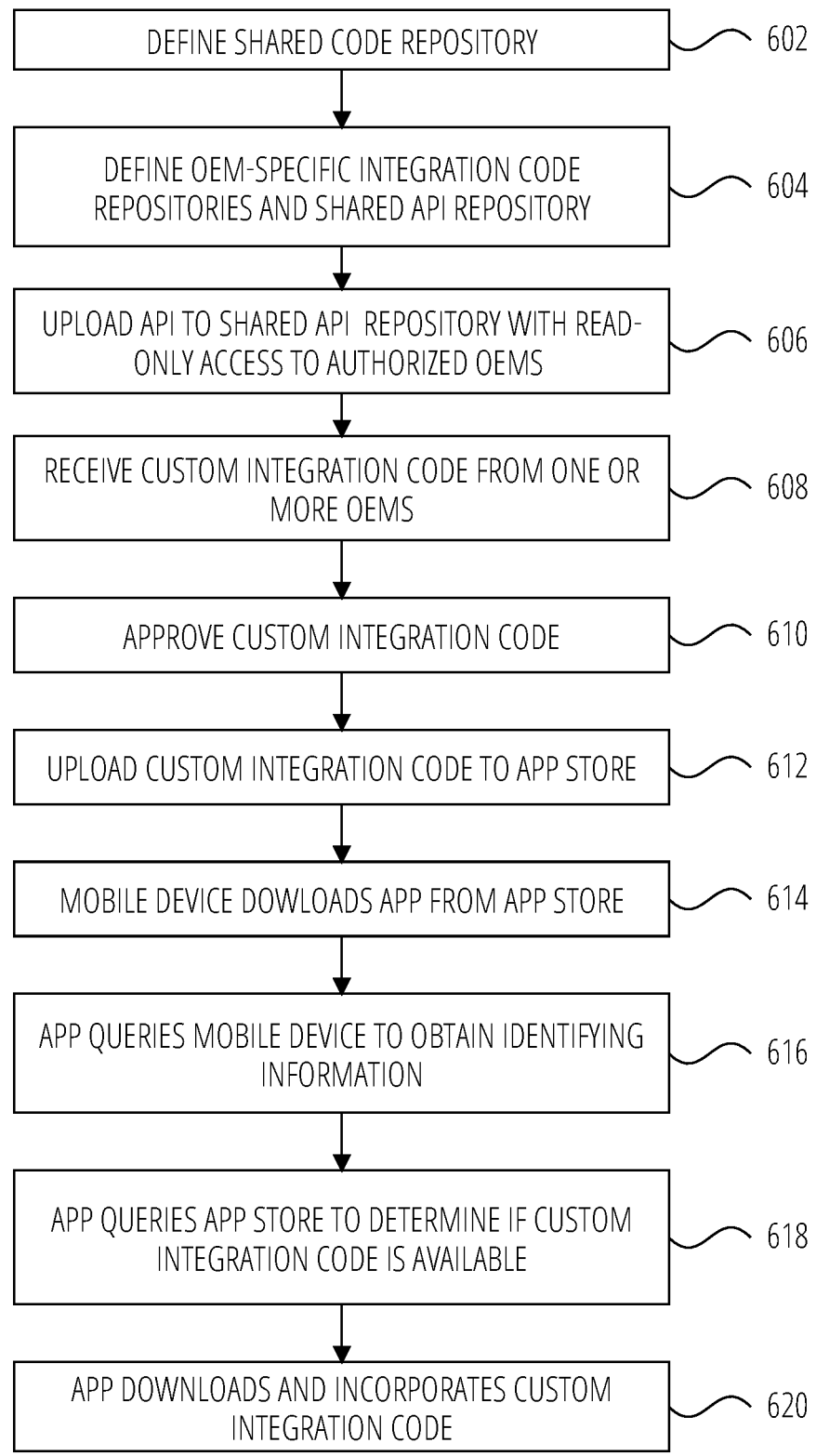
FIG. 6 is a flowchart illustrating a method of providing a shared repository for developing a hardware API framework and for providing a customized version of an app running on a mobile device.

FIG. 6 is a flowchart illustrating a method of providing a shared repository for developing a hardware API framework in a shared repository and for providing a customized version of an app running on a mobile device.

The method starts at operation 602 with an app developer creating and defining a shared code repository, for example integration code repository 108, at operation 602. Access to the shared code repository is limited by security settings and login requirements to the app developer and authorized OEMs.

The app developer then creates OEM-specific implementation code repositories within shared code repository, e.g. OEM 1 implementation repository 122, OEM 2 implementation repository 124 etc. within integration code repository 108, at operation 604. Read/write access to a particular OEM-specific implementation code repository is limited by security settings and login requirements to the app developer and the particular OEM.

Also in operation 604, the app developer creates a shared API repository within shared code repository, e.g. API repository 120 within integration code repository 108, at operation 604. OEMs are limited by security settings and login requirements to read-only access to the API repository 120, while the app developer has read/write access.

The app developer then uploads a hardware-function API, used in a generic version of the app, to the shared API repository, with read-only access by all authorized OEMs, at operation 606.

Individual OEMs then download and customize the API to generate custom OEM integration code 118, which is then either uploaded to the implementation code repository corresponding to the particular OEM or to an app developer code repository, e.g. app developer code repository 110, at operation 608.

The custom OEM integration code 118 is then reviewed by the app developer and, if appropriate, approved at operation 610 The approved OEM integration code is then uploaded to an app store 112 at operation 612. The OEM integration code includes various identifiers, e.g. an identification of the app 116, mobile device 104, operating system etc., which permits the relevant version of the OEM integration code to be identified to the app store 112 by the app 116. It will be appreciated that a single app 116 may run on different mobile devices provided by a number of different OEMs, and accordingly that there may be a number of different approved OEM integration code versions that may be used with the app 116.

In response to a user request, a mobile device 104 then downloads and installs an app 116 from the app store 112 at operation 614. The app 116 then queries the mobile device 104 to obtain identifying information at operation 616. The app 116 then queries the app store 112 at operation 618 using the identifying information obtained at operation 616 to determine if custom integration code is available for the specific combination of app 116 and mobile device 104. If so, the app 116 downloads and incorporates the custom integration code 126 at operation 620, which is then used by the app 116 above as described with reference to FIG. 1 to FIG. 5.

Machine Architecture

Figure 7:
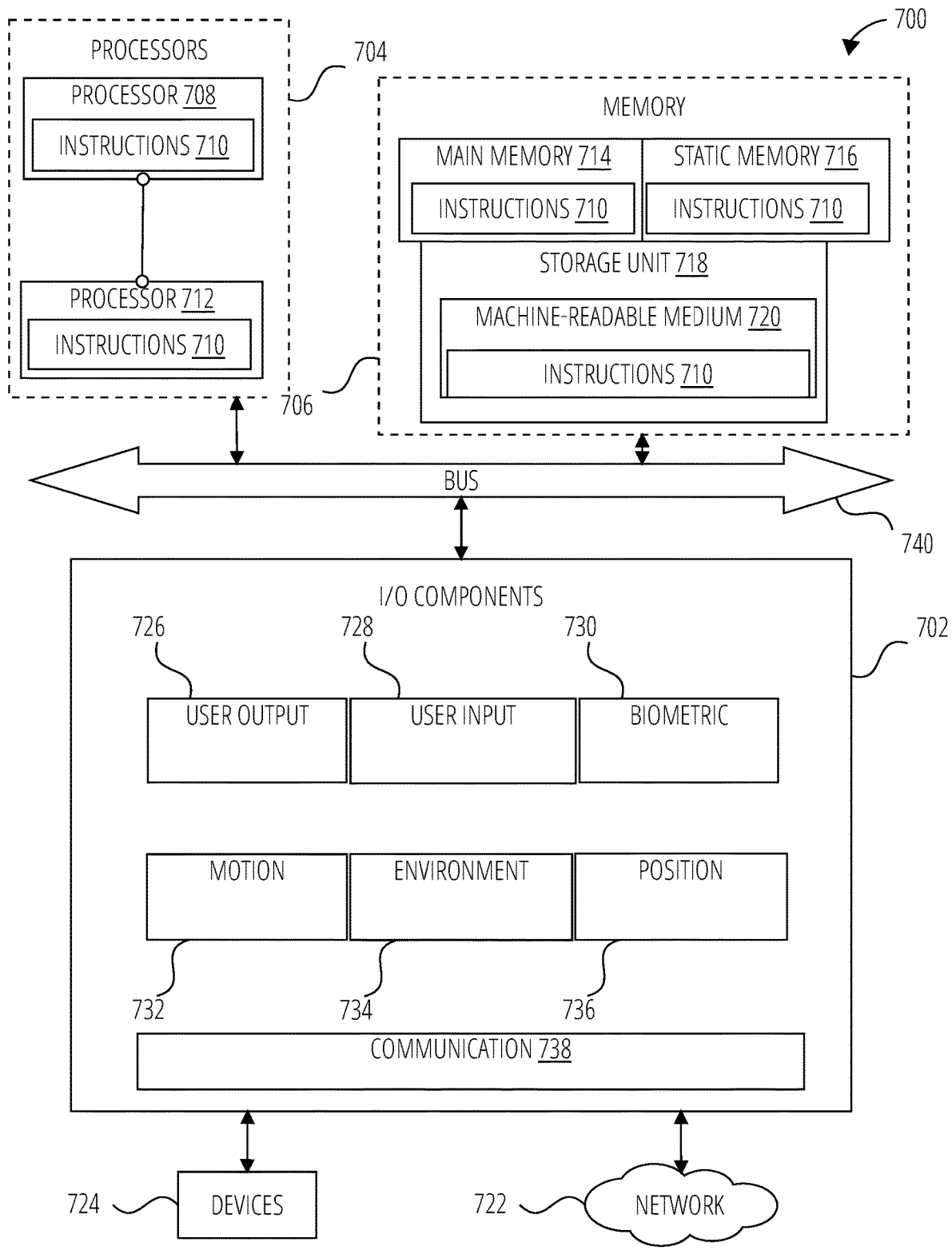
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the mobile device 104 or any one of a number of server devices forming part of an SDK server system. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 838, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the mobile device 104 may have a camera system comprising, for example, front cameras on a front surface of the mobile device 104 and rear cameras on a rear surface of the mobile device 104. The front cameras may, for example, be used to capture still images and video of a user of the mobile device 104 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the mobile device 104 may also include a 360° camera for capturing 360° photographs and videos.

Further, the camera system of a mobile device 104 may include dual rear cameras (e.g., a primary camera as well as a depth-sensing camera), or even triple, quad or penta rear camera configurations on the front and rear sides of the mobile device 104. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
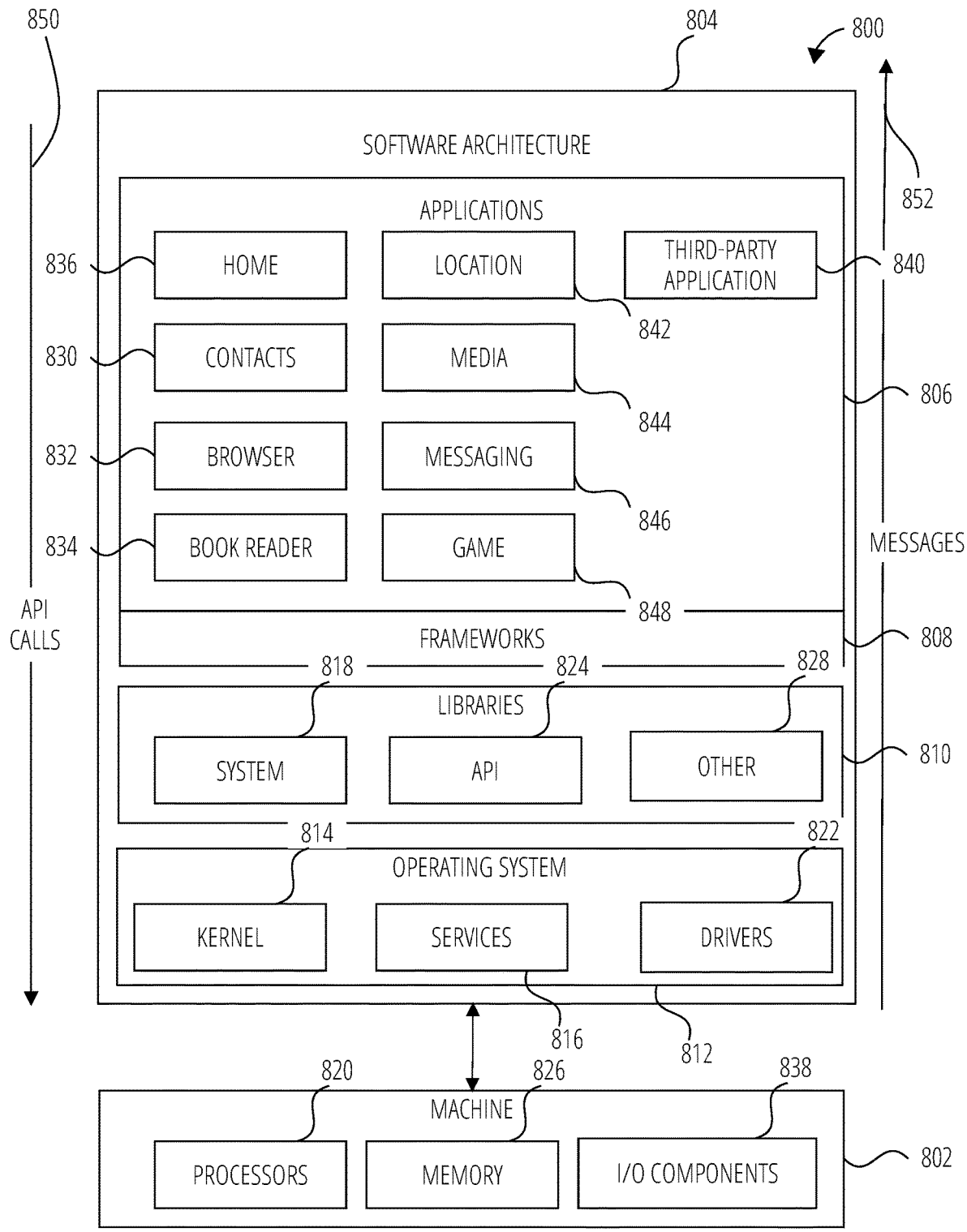
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 820 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks, and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of handling a hardware request in a computing device including one or more processors, comprising:
    receiving a request for a hardware-related function from an application service module;
    determining if the hardware-related function can be provided by an OEM-specific SDK;
    based on a determination that the hardware-related function can be provided by an OEM-specific SDK, providing commands and parameters related to the hardware-related function to the OEM-specific SDK; and
    based on a determination that the hardware-related function cannot be provided by an OEM-specific SDK, providing commands and parameters related to the hardware-related function to an operating system hardware abstraction layer,
wherein the determining if the hardware-related function can be provided by an OEM-specific SDK is performed by integration code comprising a group of operating system hardware control interfaces that are standard to an operating system and a group of custom OEM hardware control interfaces corresponding to the OEM-specific SDK.

2. The method of claim 1 wherein the determining is performed by a custom library downloaded to an OEM-specific hardware device.

3. The method of claim 1 wherein the hardware-related function is supported by default in an operating system of the computing device and the request for the hardware-related function is a default request, the method further comprising:
    providing commands and parameters related to the default request to the OEM-specific SDK.

4. The method of claim 2 wherein the application service module is contained in part of an application that is not OEM-specific.

5. The method of claim 1 wherein, after receiving commands and parameters related to the hardware-related function, the OEM-specific SDK calls the hardware abstraction layer.

6. The method of claim 1 wherein, after receiving commands and parameters related to the hardware-related function, the OEM-specific SDK interacts more directly with corresponding hardware, to accomplish the hardware-related function.

7. The method of claim 1 wherein the request for the hardware-related function is received indirectly from the application service module via a service manager that is generic to an operating system running on the computing device.

8. A computer system comprising:
    one or more processors; and
    a memory storing instructions that, when executed by the one or more processors, configure the computer system to perform operations for handling a hardware request, comprising:
    receiving a request for a hardware-related function from an application service module;
    determining if the hardware-related function can be provided by an OEM-specific SDK;
    based on a determination that the hardware-related function can be provided by an OEM-specific SDK, providing commands and parameters related to the hardware-related function to the OEM-specific SDK; and
    based on a determination that the hardware-related function cannot be provided by an OEM-specific SDK, providing commands and parameters related to the hardware-related function to an operating system hardware abstraction layer,
    wherein the determining if the hardware-related function can be provided by an OEM-specific SDK is performed by integration code comprising a group of operating system hardware control interfaces that are standard to an operating system and a group of custom OEM hardware control interfaces corresponding to the OEM-specific SDK.

9. The computer system of claim 8 wherein the determining is performed by a custom library downloaded to an OEM-specific hardware device.

10. The computer system of claim 8 wherein the hardware-related function is supported by default in an operating system of the computing system and the request for the hardware-related function is a default request, the operations further comprising:
    providing commands and parameters related to the default request to the OEM-specific SDK.

11. The computer system of claim 9 wherein the application service module is contained in part of an application that is not OEM-specific.

12. The computer system of claim 8 wherein, after receiving commands and parameters related to the hardware-related function, the OEM-specific SDK calls the hardware abstraction layer.

13. The computer system of claim 8 wherein, after receiving commands and parameters related to the hardware-related function, the OEM-specific SDK interacts more directly with corresponding hardware, to accomplish the hardware-related function.

14. The computer system of claim 8 wherein the request for the hardware-related function is received indirectly from the application service module via a service manager that is generic to an operating system running on the computing device.

* * * * *